United States Patent
Na et al.

(10) Patent No.: US 6,504,996 B1
(45) Date of Patent: Jan. 7, 2003

(54) APPARATUS FOR TRANSMITTING INFORMATION VIA A NETWORK TO A DEVICE THAT CAN DISPLAY A USER INTERFACE, AND METHOD THEREOF

(75) Inventors: Il-ju Na, Suwon (KR); Jeong-joo Jeong, Suwon (KR); Jae-dae Chang, Suwon (KR); Jong-wook Park, Suwon (KR)

(73) Assignee: Samsung Electronics Co. Ltd., Kyungki-do (KR)

(*) Notice: Subject to any disclaimer, the term of this patent is extended or adjusted under 35 U.S.C. 154(b) by 0 days.

(21) Appl. No.: 09/335,677

(22) Filed: Jun. 18, 1999

(30) Foreign Application Priority Data

Jun. 19, 1998 (KR) .......................................... 98-23208
Oct. 1, 1998 (KR) .......................................... 98-41377

(51) Int. Cl.⁷ ............................................. H04N 5/781
(52) U.S. Cl. ........................... 386/125; 386/46; 386/95; 348/563
(58) Field of Search ............................. 386/125–126, 386/52, 55, 46, 95, 96, 98, 102; 348/552, 563; H04N 5/781

(56) References Cited

U.S. PATENT DOCUMENTS

| 5,760,698 A | * | 6/1998 | Lijima et al. | .......... 340/825.17 |
| 5,805,806 A |   | 9/1998 | McArthur | ................ 395/200.8 |
| 6,038,368 A | * | 3/2000 | Boetje et al. | .................. 386/52 |
| 6,211,800 B1 | * | 4/2001 | Yanagihara et al. | .......... 341/50 |
| 6,233,393 B1 | * | 5/2001 | Yanagihara et al. | ........ 386/125 |

FOREIGN PATENT DOCUMENTS

| CN | 1182934 A | 5/1998 | |
| EP | 0 833 514 A2 | 4/1998 | ............ H04N/7/24 |
| EP | 0 843 482 A2 | 5/1998 | ............ H04N/7/24 |
| EP | 0 849 884 A1 | 6/1998 | ............ H04B/1/20 |
| EP | 0 889 649 | 1/1999 | |
| EP | 0 949 820 A2 | 10/1999 | ............ H04N/7/24 |
| JP | 10-106142 | 4/1998 | |
| JP | 10-145784 | 5/1998 | ............ H04N/7/24 |
| KR | 98-39914 | 8/1998 | ........... H04L/12/18 |
| WO | WO 97/46009 | 12/1997 | ............ H04N/5/44 |
| WO | WO 99/40720 | 8/1999 | |

* cited by examiner

Primary Examiner—Vincent Boccio
(74) Attorney, Agent, or Firm—Sughrue Mion, PLLC (57) ABSTRACT

An apparatus for transmitting information via a network, and a method therefor. The information transmission apparatus includes a first device having a transport format converter for receiving user interface data in put via a user interface, the user interface for commanding and controlling the first device, and for converting information into a transport format for transmission, a second device having a display unit, the display unit for displaying the user interface or commanding and controlling the first device, and a physical layer for linkig the first and second devices for communications. The IEEE 1394 interface is adopted as the physical layer, so that the second device can control the operation of a digital versatile disc (DVD) player as the first device, and interfacing between devices using the MPEG-2 transport stream becomes easier.

31 Claims, 5 Drawing Sheets

APPARATUS FOR TRANSMITTING INFORMATION VIA A NETWORK TO A DEVICE THAT CAN DISPLAY A USER INTERFACE, AND METHOD THEREOF

BACKGROUND OF THE INVENTION

1. Field of the Invention

The present invention relates to digital data transmission, and more articularly, to both an apparatus and a method for transmitting information from a digital versatile disc (DVD) via a network to a device which can display a user interface to control the display DVD information.

2. Description of the Related Art

In general, digital versatile disc (DVD) players decode a bit stream read from a disc using a video decoder installed therein, and convert the decoded video signal to an analog television (TV) signal using a scheme such as the National Television System Committee (NTSC) standard.

Figure 1:
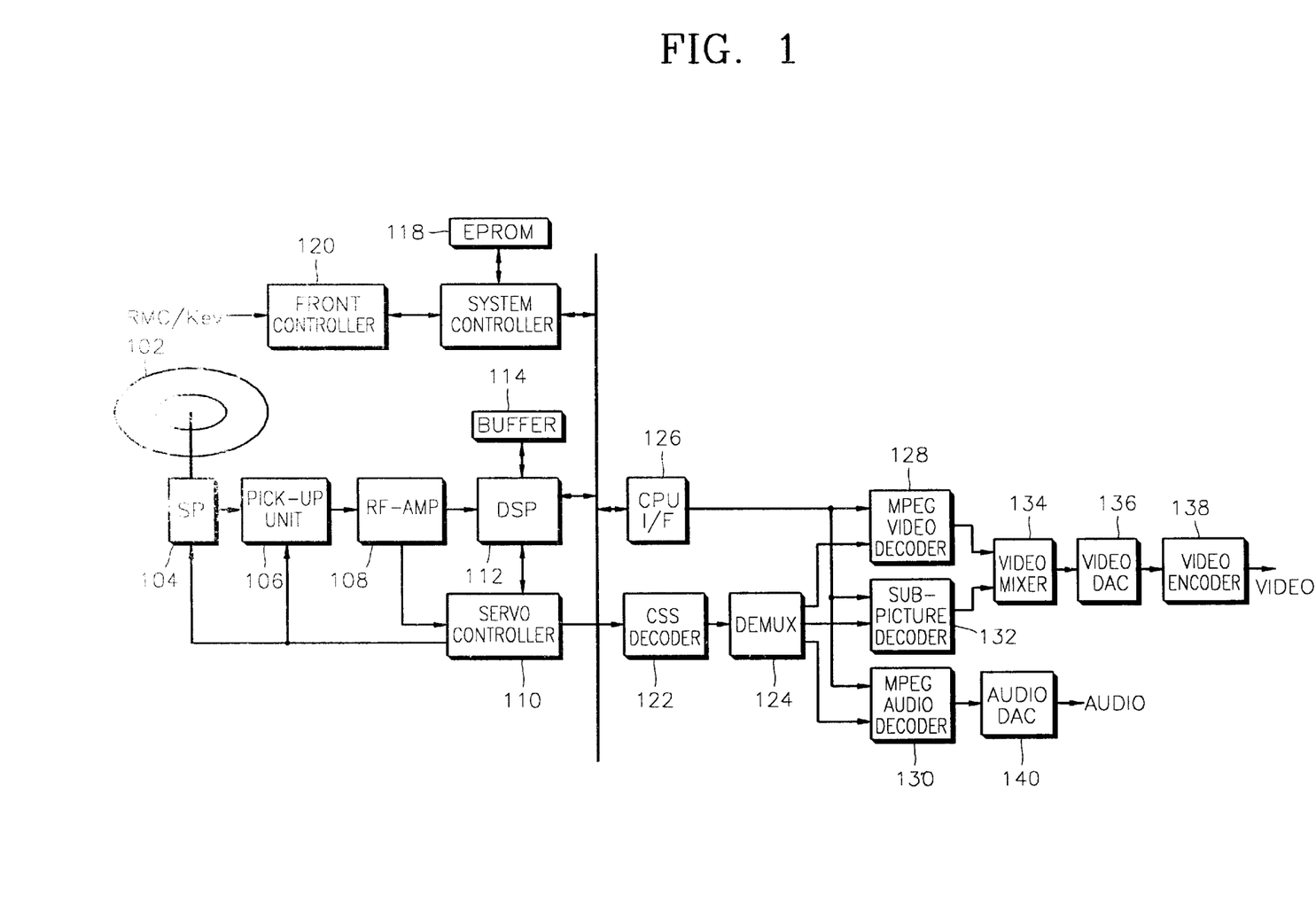
FIG. 1 is a block diagram of a general digital versatile disc (DVD) player.

The structure of such a general DVD player is shown in FIG. 1. In FIG. 1, a spindle motor (SP) 104 rotates a disc 102. A pick-up unit 106 receives light which has been irradiated onto and reflected off the disc 102 to read data from the disc 102. Also, the pick-up unit 106 includes a deck mechanism capable of transporting the pick-up and loading the disc 102.

A radio-frequency amplifier (RF-AMP) 108 amplifies an RF signal picked up by the pick-up unit 106, removes noise, performs analog-to-digital conversion and detects a synchronization (sync) signal. A servo controller 110 controls the rotation of the disc 102 and the focusing and tracking of the pick-up in order to accurately read data from the disc 102, under the control of a system controller 116. An eight-to-fourteen modulation (EFM) signal output from the RF-AMP 108 is provided to a digital signal processor (DSP) 112.

The DSP 112 demodulates the EFM signal read from the disc 102 and performs phase compensation of data using a phase locked loop (PLL) based on the detected sync, descrambling, error detection/correction, and controlling of a buffer 114. The transmission rate of a signal written to the disc 102 is greater than or equal to that of a signal read through the DSP 112, so that the data processed in the DSP 112 is temporarily stored in the buffer 114 and then transmitted when an MPEG video decoder 128 and an MPEG audio decoder 130 require the data. The series of processes are carried out under the control of the stem controller 116 such that overflow or underflow does not occur in the buffer 114. Also, the DSP 112 detects the control data portion of the bit stream read from the disc 102, and provides the detected data to the system controller 116.

The data from the DSP 112 may be scrambled in order to prevent digital copying. In this case, the scrambled data is descrambled by a content scramble system (CSS) decoder 122. The descrambled data stream is a program stream described by the Moving Picture Expert Group (MPEG) standard. The program stream comprises a video pack having an MPEG-1 or MPEG-2 format, an audio pack having an MPEG, Audio Coding (AC)-3 or linear Pulse Coded Modulation (PCM) format, a sub-picture pack and a navigation pack.

The CSS decoder 122 descrambles the bit stream provided from the DSP 112, a demultiplexer (DEMUX) 124 demultiplexes the descrambled stream into the audio pack, the video pack, the sub-picture pack and the navigation pack, the MPEG video decoder 128 decodes the demultiplexed video pack, the MPEG audio decoder 130 decodes the demultiplexed audio pack, and a sub-picture decoder 132 decodes the demultiplexed sub-picture pack such as a menu or caption. A video mixer 134 mixes the decoded video data and the sub-picture data, and a video digital-to-analog converter (DAC) 136 converts the output of the video mixer 134 to an analog signal. Then, the analog encoded video signal is output through a video encoder 138. An audio DAC 140 outputs the audio data decoded by the MPEG audio decoder 130 as an analog audio signal.

A central processing unit (CPU) interface (I/F) 126 interfaces with the system controller 116 such that the MPEG video decoder 128, the MPEG audio decoder 130 and the sub-picture decoder 132 perform decoding at a given timing according to the MPEG format.

A first memory 118 for storing various programs required by the system controller 116, may be comprised of an Erasable Programmable Read-only Memory (EPROM), and a front controller 120 transmits key data input by a user via a remote controller or from a front panel of the player, to the system controller 116.

In order to transmit video and audio information from a general DVD player to a display device for display such as a TV receiver or monitor, the DVD player transmits the video and audio signals using predetermined signal lines according to an analog interface. That is, a data transmission channel between the DVD player and the display device for display is installed by a user by directly connecting a plurality of signal lines, that is, a first channel for video and second through sixth channels for audio, from each connector of the DVD player to the display device, so that the video and audio signals provided by the DVD player are transmitted in analog signal form through the signal lines to the display device. For high quality video information transmission, a super video (S-Video) output is separated and transmitted through a specific cable. However, the transmission mode of the super video output is in an analog signal form.

Also, in order to transmit a digital information, DVD players adopt the Sony Philips Digital Interface (SPDIF) in which a video signal is output to its connector as a digital signal and transmitted to the display device through signal lines. However, the SPDIF cannot support complicated functions such as controlling the DVD player via the display device or inspecting the operation status of the DVD player.

The analog interface has the drawback of noise interference during the transmission of a signal. That is, various factors, such as the connection status of a connector, the quality of signal lines or noise generated near the analog interface, can greatly affect the quality of the transmitted video and audio signals, and the fidelity of a transmitted signal is determined by physical characteristics of the signal lines themselves. Also, the analog interface has the following additional problems.

First, a DVD remote controller is required to control a DVD player. Even though a TV set is nothing but a display terminal, it requires a remote controller for controlling the function of the TV set. Thus, if there is the need to connect a plurality of devices, a plurality of remote controllers are required, so that a user becomes inconvenienced.

Second, if an analog interface is used to connect digital devices, the various network functions a digital interface provides cannot be implemented.

If a digital interface such as the IEEE 1394 is adopted, the above problems can be solved. However, the abovementioned DVD player is manufactured for reproduction in a TV set having an analog input, without careful consideration of a digital TV set. Accordingly, even though the DVD player and a digital TV are connected by the IEEE 1394 interface, it is difficult to reproduce the current standard DVD information using a digital TV. That is, because a digital TV, a receiver for receiving high definition television (HDTV) broadcasting, can process a bit stream having an MPEG-2 Transport Stream (TS) format while the DVD player stores a bit stream having an MPEG-2 Program Stream (PS) format, the format conversion from the MPEG-2 PS format to the MPEG-2 TS format must be done in advance in order to transmit the data from the DVD player through the IEEE 1394 interface to the display device adopting the MPEG-2 TS format.

SUMMARY OF THE INVENTION

It is an object of the present invention to provide an apparatus for transmitting digital versatile disc (DVD) information via a network to a display device, in which the display of DVD information can be controlled by the display device according to the control command of a user.

It is another object of the present invention to provide a method for transmitting DVD information via a network to a display device, by which the display of DVD information can be controlled according to the control command of a user.

To achieve the first object, there is an apparatus for transmitting information between devices via a network, comprising: a first device having a transport format converter for receiving user interface data input via a user interface, wherein the user interface is used for commanding and controlling the first device, and for converting information into a transport format for transmission; a second device having a dislay wherein, the display displays the user interface wherein the interface is used for commanding and controlling the first device; and a physical layer for linking the first and second devices.

To achieve the second object, there is provided a method for transmitting information between devices via a network, comprising: connecting a first device to a network, wherein the first device receives user interface data input via a user interface, wherein the user interface is used for commanding and controlling a first device and for converting information to a transport format for transmission; connecting a second device to the network, wherein the second device is used for displaying the user interface for commanding and controlling the first device; receiving the user interface data in the second device; displaying the user interface data in the second device; allowing a user to input a command in response to the user interface displayed in the second device; and transmitting control and command information from the second device to the first device according to the user input, to control access to information provided by the first device.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 2:
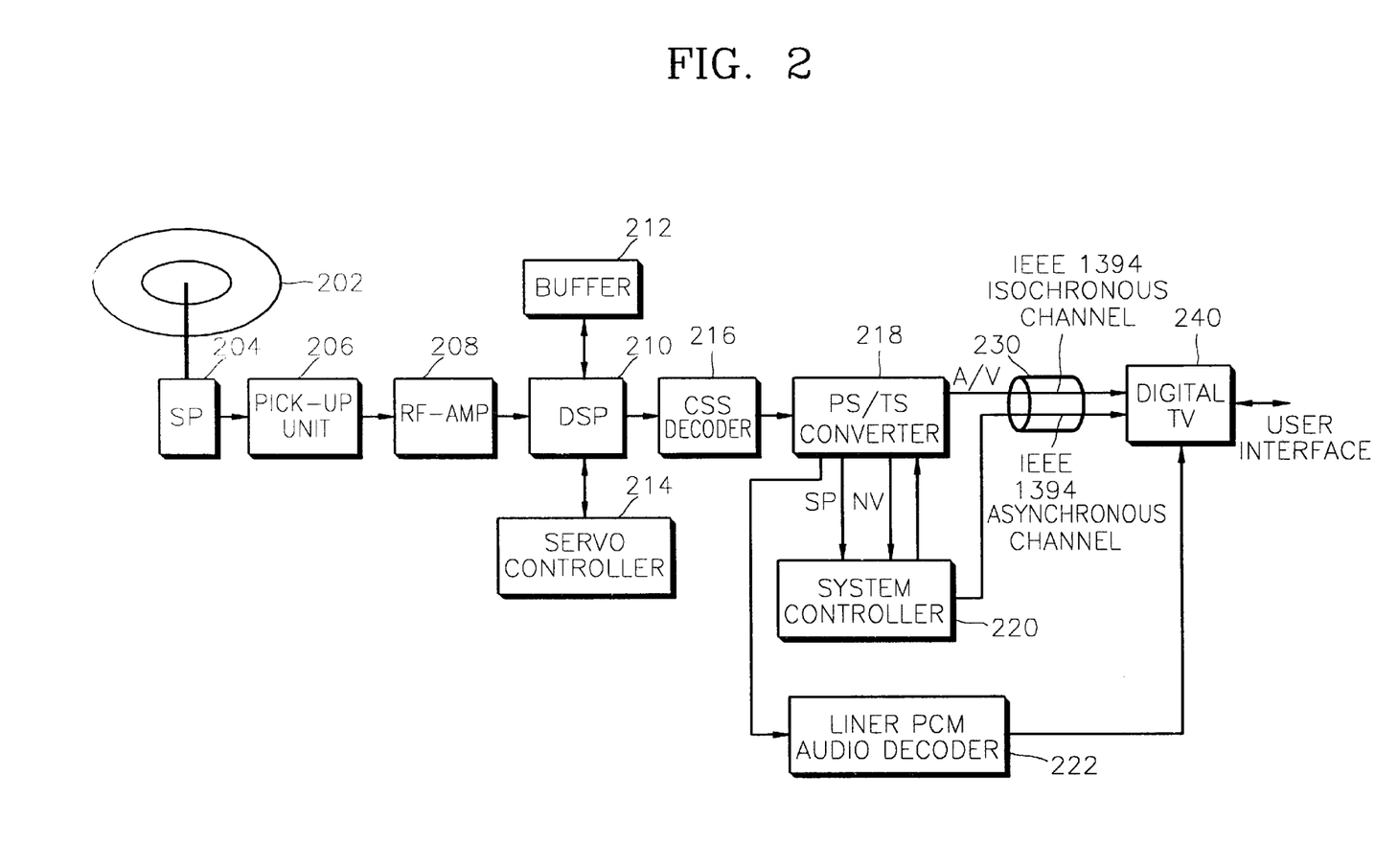
FIG. 2 is a block diagram of a transmission apparatus according to a preferred embodiment of the present invention.

Referring to FIG. 2, in an apparatus for transmitting information via a network according to a preferred embodiment of the present invention, a digital versatile disc (DVD) player used as a server (first device) and a digital television (TV) used as a client (second device) are connected through a digital interface, e.g., an IEEE 1394 cable.

In FIG. 2, the structure and operation of a spindle motor 204, a pick-up unit 206, a radio-frequency amplifier (RF-AMF) 208, a servo controller 214 and a digital signal processor (DSP) 210 and a buffer 212 are the same as those of FIG. 1, thus explanation thereof is omitted.

A content scramble system (CSS) decoder 216 descrambles the data provided from the DSP 210 if the data output from the DSP 210 is scrambled for the purpose of preventing a digital copying. The descrambled stream, a program stream prescribed in the MPEG standard, comprises a video pack having an MPEG-1 or MPEG-2 format, an audio pack having an MPEG, Audio Coding (AC)-3 or linear Pulse Coded Modulation (PCM) format, a sub-picture pack and a navigation pack.

Here, the navigation pack includes various types of information capable of controlling a bit stream, for example, menu button information, highlight information, angle selection information and disc search information. Also, image information for displaying caption or menu is stored in the sub-picture pack. The menu is displayed with reference to screen control information stored in the navigation pack, which includes information such as the position of buttons on a screen, the color the number of buttons, the color of a selected button, and the color of an executed button.

A PS-to-TS (PS/TS) converter 218 converts data having a program stream (PS) format provided from the CSS decoder 216 to data having a transport stream (TS) format under the control of a system controller 220, transmits audio/video (A/V) data having the TS format through the isochronous channel of an IEEE 1394 interface 230 to a digital television (TV) 240, and provides the navigation pack and the sub-picture pack separated from the program stream to the system controller 220.

The IEEE 1394 interface 230 comprises a web server having a protocol stack including a physical layer, a link layer, an IP (Internet Protocol) layer on the link layer, an Address Resolution Protocol (ARP) layer, a Transmission Control Protocol (TCP) layer, a User Datagram Protocol (UDP) layer, a HyperText Transfer Protocol (HTTP) layer and a Dynamic Host Configuration Protocol (DHCP) layer. The applicant has disclosed such an IEEE 1394 interface in U.S. patent application Ser. No. 09/104,299 entitled "Browser based command and control Home Network". Also, the. IEEE 1394 interface 230 can use A/V Control and Transaction Set (AV/C CTS) control commands for control between devices, rather than a client/server scheme as in the TCP/IP structure of the Internet.

The system controller 220 reads desired data from the disc 202 through servo control, data search and deck mechanism control, and manages the DSP 210 and the buffer 212 such that overflow or underflow of a program stream having variable bit rates does not occur. Also, a web page is provided using a protocol stack for a web server function, so that the web-server function can be performed according to the coordinate information detected by the web browser of the digital TV 240. Here, the operation of the DVD player is controlled by the digital TV 240 using a received information, rather than using a remote control signal for the DVD player, and the contents of the disc are reproduced.

For the case where the audio data is in the PCM format and the system to be used does not include a PCM decoder, a linear PCM audio decoder 222 may be further included.

Figure 3:
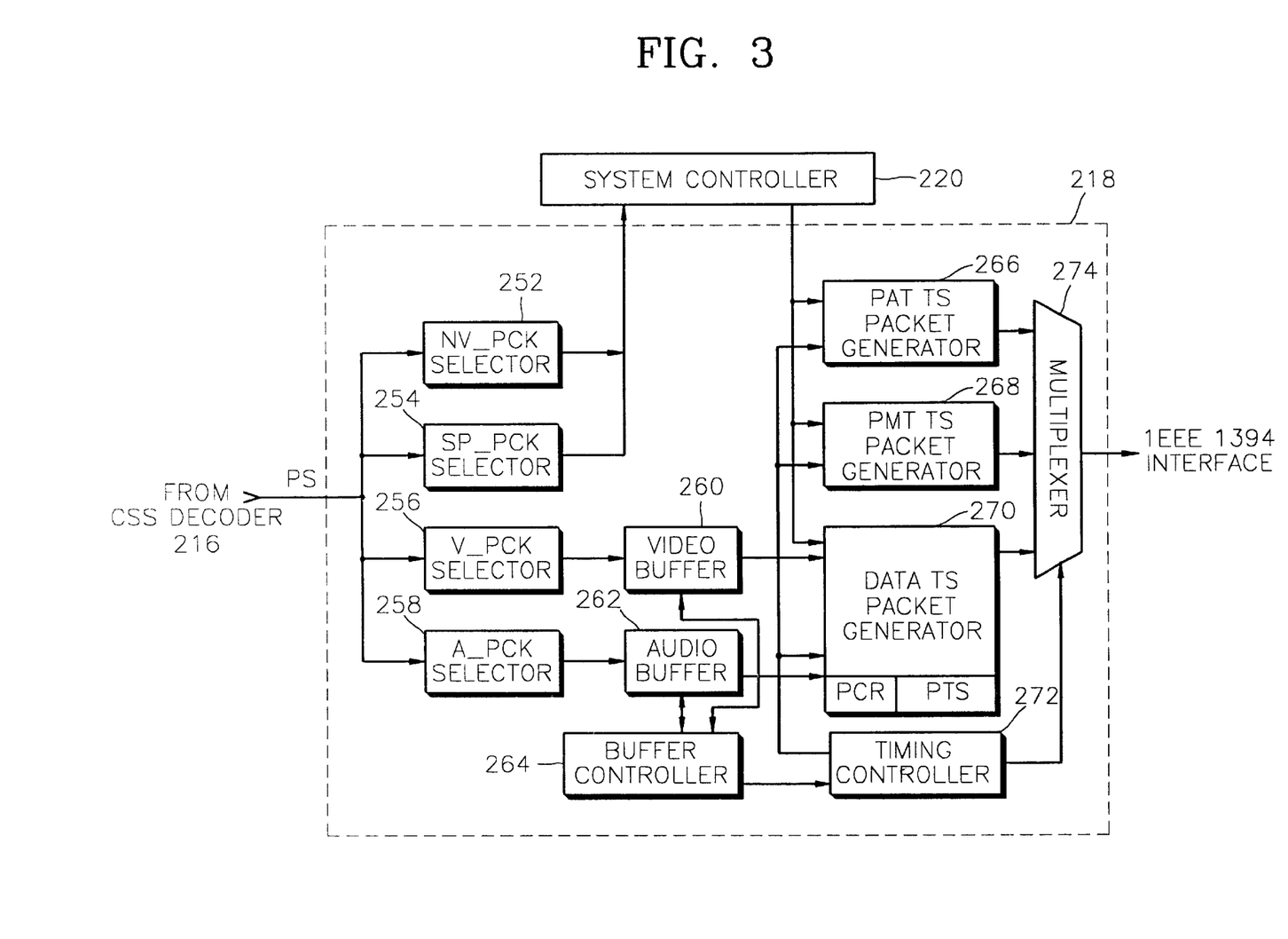
FIG. 3 is a detailed block diagram of the PS/TS converter of FIG. 2.

FIG. 3 is a block diagram of the PS/TS converter 218 shown in FIG. 2. The PS/TS converter 218 comprises a navigation pack (NV_PCK) selector 252, a sub-picture pack (SP_PCK) selector 254, a video pack (V_PCK) selector 256, an audio pack (A_PCK) selector 258, a video buffer 260, an audio buffer 262, a buffer controller 264, a PAT TS packet generator 266, a PMT TS packet generator 268, a data TS packet generator 270, a timing controller 272 and a multiplexer 274.

That is, the NV_PCK selector 252 and the SP_PCK selector 254 extract the so navigation pack for data control and the sub-picture pack from the PS provided by the CSS decoder 216 of FIG. 2. The V_PCK selector 256 and the A_PCK selector 258 extract the video and audio packs from the PS, and the video buffer 260 and the audio buffer 262 temporarily store the extracted packs. The buffer controller 264 controls the data input/output of the video buffer 260 and the audio buffer 262, and calculates the amount of data stored in the video buffer 260 and the audio buffer 262.

Here, the MPEG-2 system hierarchy will be briefly explained. One program consists of video information, audio information and other data information. In the MPEG-2 TS prescribed in the MPEG-2 system, various programs including video, audio and data information are time division multiplexed in one stream. Also, PSI (Program Specific Information) is included to allow a receiving device to receive a transmission stream to appropriately extract audio, video and data information corresponding to a desired program. In general, the PSI is implemented in a table form, such as Program Association Table (PAT), Program Map Table (PMT) or Conditional Access Table (CAT). The PAT and the PMT are important. Only one PMT exists per program, in which serial numbers of TS packets (having a fixed length of 188 bytes) containing video and audio streams of the corresponding program, called packet identifier (PID), are summarized in the order of items. That is, the video stream of the program is expressed as PID=xxxx and the audio stream as PID=YYYY.

In general, because a plurality of programs exist in one TS, a plurality of PMTs are in the TS. Thus, an integrated table for connecting the various programs transmitted in the current TS to the PIDs of the PMT for each program is required, and such an integrated table is the PAT. In general, because one program is represented by one program number, items of the PAT consist of program numbers (=xxxx) and information defining the relationship between the PMT and PIDs.

Thus, the PAT TS packet generator 266 generates PAT TS packets by receiving header ID information output from the system controller 220 and packet generation timing information provided by the timing controller 272. The PMT TS packet generator 268 generates PMT TS packets by receiving header ID information output from the system controller 220 and packet generation timing information provided by the timing controller 272. The data TS packet generator 270 receives AN data from the video buffer 260 and the audio buffer 262 and generates data TS packets including Program Clock Reference (PCR) and Presentation Time Stamp (PTS) under the control of the timing controller 272.

The timing controller 272 provides the PAT TS packet generator 266 and the PMT TS packet generator 268 with packet generation timing information, such that PMT TS and PAT TS packets are repeatedly generated in a predetermined period. Also, transmission timing is controlled such that each of the PAT TS and PMT TS packets are transmitted once in every in 7 msec. The timing controller 272 controls the packet generation timing of the data TS packet generator 270 by receiving information about the capacity of the video buffer 260 and the audio buffer 262 from the buffer controller 264. The multiplexer 274 multiplexes the outputs of the PAT TS packet generator 266, the PMT TS packet generator 268 and the data TS packet generator 270 under the control of the timing controller 272, and transmits the multiplexed result in the MPEG-2 TS format.

Figure 4:
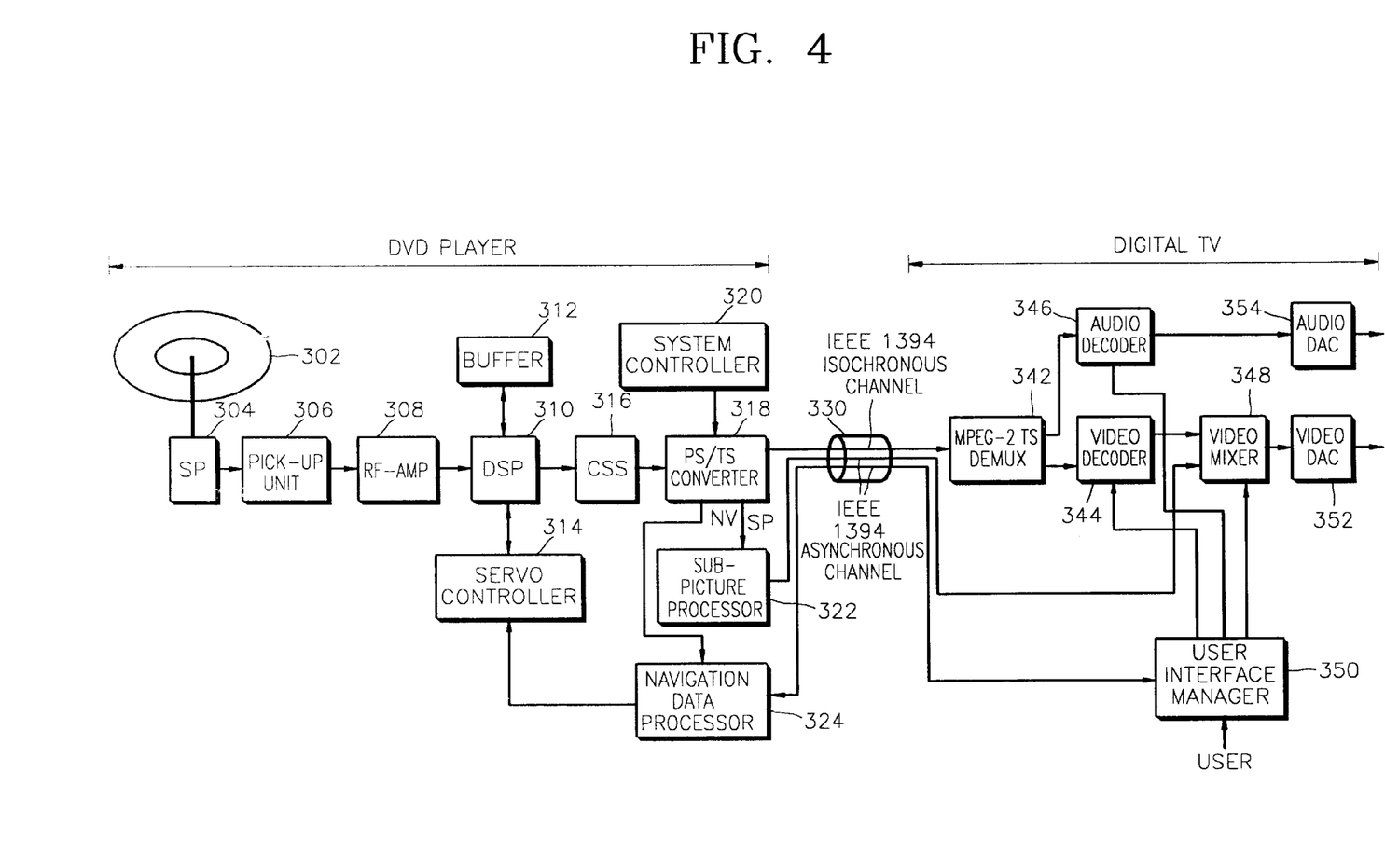
FIG. 4 is a block diagram of a transmission apparatus according to another embodiment of the present invention.

FIG. 4 is a block diagram of an information transmission apparatus according to another embodiment of the present invention. In comparison to the structure of the apparatus shown in FIG. 2, a DVD player used as a server (first device) further comprises a sub-picture processor 322 and a navigation data processor 324. Also, a PCM audio decoder (not shown) may be further included. Here, an MPEG video decoder and an MPEG audio decoder which are normally included in the DVD player are omitted because their functions have no relationship with the present invention.

Also, a digital TV used as a client (second device) comprises an MPEG-2 TS demultiplexer (DEMUX) 342, a video decoder 344, an audio decoder 346, a video mixer 348, a user interface manager 350, a video DAC 352 and an audio DAC 354.

In FIG. 4, the PSITS converter 318 provides a MPEG-2 TS for A/V data through an IEEE 1394 isochronous channel to the MPEG-2 TS DEMUX 342, and provides the sub-picture processor 322 and the navigation data processor 324 with a sub-picture pack and a navigation pack extracted from a PS.

The sub-picture processor 322 processes the sub-picture pack information from the PS/TS converter 318 and transmits bit map image information through the IEEE 1394 asynchronous channel to the video mixer 348. The navigation data processor 324 decodes Presentation Control Information (PCI) of the navigation pack information provided by the PSITS converter 318 and transmits the obtained screen control information through the IEEE 1394 asynchronous channel to the user interface manager 350, and receives command data through the IEEE 1394 asynchronous channel from the digital TV, which controls the operation of the DVD player according to user key input, to control a servo controller 314 for the search of data. Here, the screen control information for a sub-picture includes a format for transmission control information in pixel units and information about when, in which place on the screen, and in which color, the regions of the sub-picture information are displayed. The screen control information for the sub-picture and the bit map image information is formatted in a predetermined format to be transmitted to the controller of the display device (digital TV), i.e., the video mixer 348 and the user interface manager 350.

Meanwhile, at the client end for receiving the DVD information, for example, in a digital TV (DTV) or a monitor capable of displaying MPEG-2 TS information, the MPEG-2 TS DEMUX 342 demultiplexes the TS output through the IEEE 1394 isochronous channel from the PSITS converter 318 into a video stream and an audio stream.

The video decoder 344 decodes the demultiplexed video stream and outputs a decoded video signal at a given timing by determined the MPEG-2 video format under the control of the user interface manager 350. Also, the audio decoder 346 decodes the demultiplexed audio stream and outputs a decoded audio signal at a given timing according to the MPEG-2 audio format under the control of the user interface manager 350.

The video mixer 348 further comprises a general function for screen display 85 of simple graphic information, and mixes the sub-picture transmitted from the DVD player with a video signal to match the synchronization and position thereof according to the transmitted screen control information, and outputs a mixed signal to the video DAC 352.

That is, when a command to display sub-picture information, such as menu screens or captions, is input from a user, the video mixer 348 expresses a bit map image through a graphic overlay for a given amount of time in the corresponding place of a screen, according to the bit map image information of a sub-picture which is transmitted through the IEEE 1394 asynchronous channel from the sub-picture processor 322 of the DVD player, and the screen control information which is generated by the navigation data processor 324 and transmitted through the IEEE 1394 asynchronous channel.

The function of the video mixer 348, relating to the graphic overlay, may be implemented with a browser installed in the device. In this case, the browser displays the sub-picture in, a screen.

Unlike a conventional user interface manager in which control of the interface is restricted to the corresponding device, the user interface manager 350 can receive a command relating to the DVD player from a user and transmit the command to the DVD player, thereby allowing a user to select the DVD information.

That is, when a command relating to a DSI (Data Search Information) is input by a user via a key input using a remote controller to control the operation of a DVD player, the user interface manager 350 transmits the DSI command through the IEEE 1394 asynchronous channel to the navigation data processor 324 of the DVD player. Also, when the command input by the user relates to a PCI (Presentation Control Information), the user interface controller 350 transmits, for example, a command to change the color of the corresponding region of the bit map image, to the video mixer 348 according to the PCI stored therein. The navigation data processor 324 controls the servo controller 314, which controls access to the DVD disc 302, according to the DSI command transmitted through the IEEE 1394 asynchronous channel.

In a modification of the structure of FIG. 4, the bit map image information fins decoded from the sub-picture information and the screen control information for displaying the bit map image in a screen can be transmitted through the IEEE 1394 isochronous channel together with the audio and/or video (A/V) information.

In this case, the DVD player requires a circuit (selection controller) for selectively transmitting the bit map image and the screen control information, or A/V information, and a standard prescribing how to transmit the bit map image information through the IEEE 1394 isochronous channel must be established.

Figure 5:
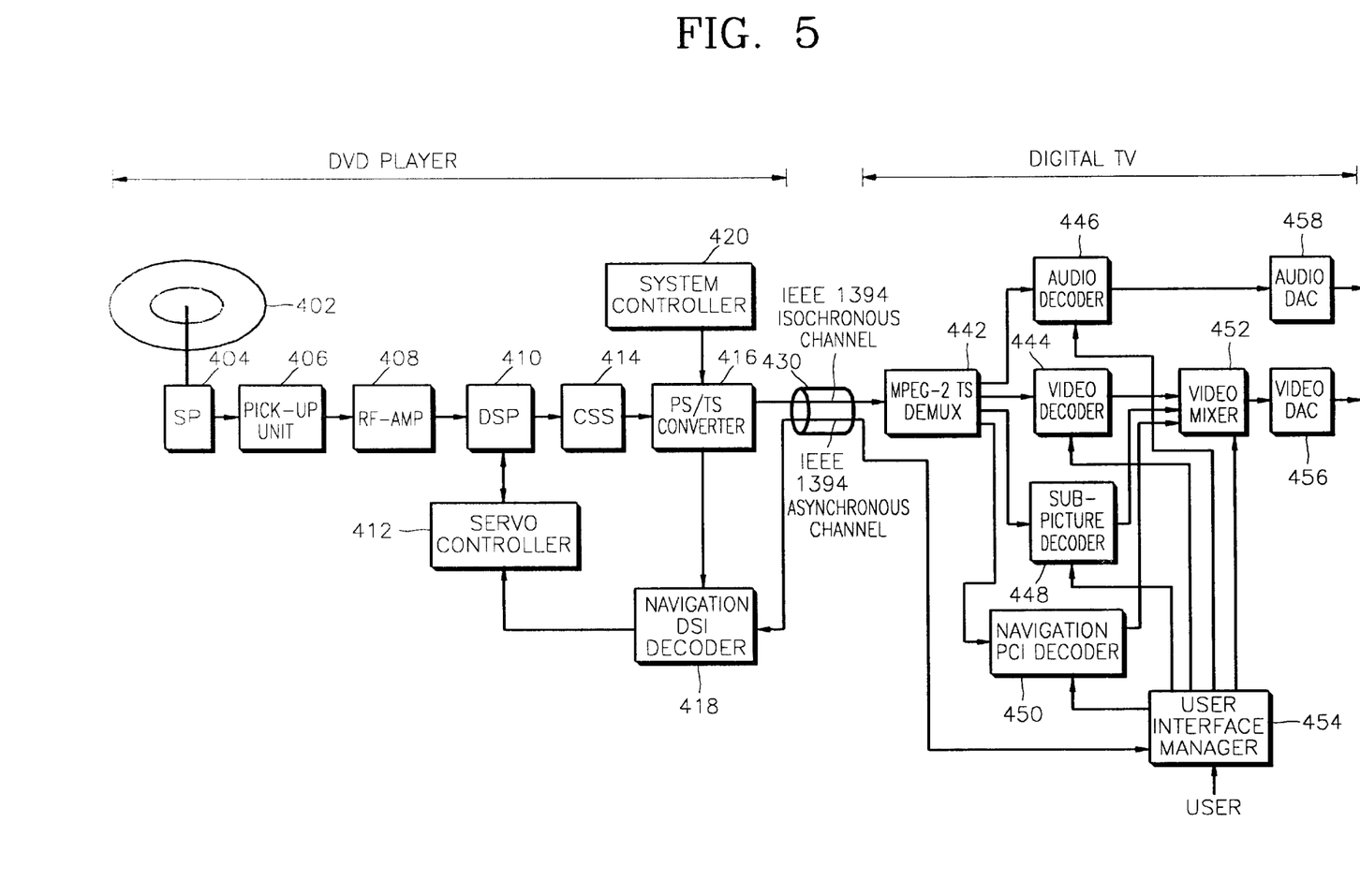
FIG. 5 is a block diagram of a transmission apparatus according to still another embodiment of the present invention.

FIG. 5 is a block diagram of an information transmission apparatus according to still another embodiment of the present invention. In comparison to the structure of the apparatus shown in FIG. 4, a PS/TS converter 416 of a DVD player packetizes a sub-picture pack and a navigation pack having a PCI extracted from the PS into a TS, and multiplexes the sub-picture and navigation packets together with PAT TS, PMT TS and data TS packets. A navigation DSI decoder 418 decodes the navigation pack having a DSI output from the PS/TS converter 416, and receives a navigation command transmitted through the IEEE 1394 asynchronous channel from a DTV. Also, the DTV further comprises a sub-picture decoder 448 and a navigation PCI decoder 450 which decode a sub-picture stream and a navigation stream, respectively, after they have been demultiplexed by an MPEG-2 TS DEMUX 442.

In FIG. 5, the PSFTS converter 416 provides the navigation pack having the DSI information extracted from the PS input from a CSS decoder 414, to the navigation DSI decoder 418, and packetizes the navigation pack having a PCI and the sub-picture pack into a navigation TS packet and a sub-picture TS packet under the control of a system controller 420. The PSJTS converter 416 multiplexes the navigation TS packet and the sub-picture TS packet together with the PAT TS, PMT TS and data TS packets and transmits a result through the IEEE 1394 isochronous channel to the DTV. The navigation DSI decoder 418 decodes the navigation DSI data provided from the PSITS converter 416 and stores the decoded data.

Also, the MPEG-2 TS DEMUX 442 of the DTV demultiplexes the MPEG-2 TS transmitted through the IEEE 1394 isochronous channel into a video stream, an audio stream, a sub-picture stream and a navigation stream. Under the control of a user interface manager 454, a video decoder 444 decodes the video stream and provides a decoded video signal to a video mixer 452, an audio decoder 446 decodes the audio stream and provides a decoded audio signal to an audio DAC 458, a sub-picture decoder 448 decodes the sub-picture stream and provides a bit map image information to the video mixer 452, and a navigation PCI decoder 450 decodes the navigation stream and provides a command relating to the PCI to the video mixer 452.

When a command to display sub-picture information, such as menu screens or captions, is input from a user, the user interface manager 454 provides the command to the video mixer 452 and the video mixer 452 displays the bit map image provided by the sub-picture decoder 448 by graphic overlay in a corresponding place of a screen and outputs a result via a video DAC 456.

When a user inputs the command relating to the PCI, the user interface manager 454 transmits the command to the navigation PCI decoder 450 and the navigation PCI decoder 450 processes the user's command according to the PCI which has been decoded and stored therein and transmits a corresponding control command to the video mixer 452.

The video mixer 452 displays the sub-picture information transmitted from the sub-picture decoder 448 in a screen according to the commands from the user interface manager 454 and the navigation PCI decoder 450, wherein pixel values corresponding to a specific sub-picture region are changed to display the sub-picture information. For example, in the case where a user selects a new button on a displayed menu, the navigation PCI decoder 450 searches for information specifying parts of the sub-picture region, the brightness value of which is to change, in the PCI information which has been decoded and stored therein, and provides a command to the video mixer 452 to change the brightness value. Then, the video mixer 452 changes the pixel value of the corresponding region of the sub-picture to display. Through the above process, a user can change the button which is highlighted in the menu for DVD control which is displayed on a DTV screen. Then, when a user selects a specific button on a menu, the corresponding command is transmitted through the IEEE 1394 asynchronous channel to the navigation DSI decoder 418 of the DVD player to execute the corresponding command.

Thus, the user interface manager 454 receives a command relating to the DVD player from the user and analyzes the command to transmit the corresponding command to the video mixer 452, the navigation PCI decoder 450 or the DVD player.

In a modification of the apparatus shown in FIG. 5, the decoding by the navigation DSI decoder 418 in the DVD player may be implemented in the display device (DTV). That is, all information read from the DVD is converted into the MPEG-2 TS and transmitted to the display device, and the display device decodes the transmitted data having the MPEG-2 TS format using a decoder installed therein and provides the result to a user. Here, a difference between this modification and the apparatus shown in FIG. 5 is that all navigation information including both PCI and DSI are decoded in the display device. To this end, the display device transmits a position command to directly access the DVD information to the system controller of the DVD player through the IEEE 1394 asynchronous channel, and then the system controller controls the servo controller that controls access to disc. For example, when a playback key of a remote controller for the display device is pressed, a command indicating the address of the disc from which the information is to be read is transmitted to the DVD player.

In another modification of the apparatus shown in FIG. 5, the navigation PCI decoder installed in the display device can be constructed in the DVD player. In this case, there is no need to multiplex the navigation information into the TS in the PS/TS converter and to transmit the navigation information to the display device. The navigation information read from the DVD can be processed by a navigation decoder installed in the DVD player. In decoding the PCI, a command specifying pixels of the sub-picture, the pixel values of which are to change, is transmitted through the IEEE 1394 asynchronous channel to the video mixer of the display device. Here, all the navigation related control commands from a user are transmitted through the IEEE 1394 asynchronous channel to the DVD player.

As described above, in the apparatus for transmitting DVD information through the IEEE 1394 interface to a display device which processes data in the MPEG TS format, the PS format is converted into the TS format, so that the information transmission apparatus according to the present invention can easily interface with a display device adopting the MPEG format.

Also, because the DVD information is transmitted as a digital signal through the IEEE 1394 interface, the information transmission apparatus according to the present invention has advantages in that attenuation of a signal due to the quality and properties of a connection medium, and deterioration of video and audio signals due to noise rarely occurs, when compared to a conventional analog interface.

Also, a user is not inconvenienced by having to connect two devices with a plurality of signal lines. That is, connecting the two devices with the single IEEE 1394 cable is enough to transmit all information, so that there is no concern about choosing high quality signal lines. Also, due to the plug & play function for self-detecting the connection status, there is no need for a user to setup information about how the two devices are connected.

According to the present invention, because the operation of the DVD player can be controlled by commands input using a remote controller for the display device, the user interface is easily achieved without the need for separate remote controllers for each device.

In addition, the IEEE 1394 digital interface according to the present invention allows the devices to be networked such that the devices can be integrally managed and operated. Also, the DVD player can be used as a server of a browser-based home network through the IEEE 1394 bus.

What is claimed is:

1. An apparatus for transmitting information between devices via a network, comprising:
   a first device having a transport format converter for receiving user interface data input via a user interface, wherein the user interface is used for commanding and controlling the first device, and for converting information into a transport format for transmission;
   a second device having a display, wherein the display displays the user interface, wherein the interface is used for commanding and controlling the first device; and
   a physical layer for linking the first and second devices, wherein the transport format converter comprises:
      an extractor for extracting video data and audio data in pack units from information in a program stream format read from a digital versatile disc (DVD);
      a first transport stream packet generator for generating an additional information transport stream packet by adding a header to additional information required for program analysis in the second device, based on header information and packet generator timing information;
      a second transport stream packet generator for generating a data transport packet stream by adding a header to both of the extracted video and audio data in pack units;
      a multiplexer for multiplexing the outputs of the first and second transport stream packet generators to provide a transport stream; and
      said timing controller for controlling the timing in the generation of the additional information transport stream packet and the data transport stream packet,
   wherein the physical layer is an Institute of Electrical & Electronics Engineers (IEEE) 1394 interface, and
   wherein the extractor extract navigation and sub-picture in pack units from the information and the first device further comprises:
      a sub-picture processor for decoding the sub-picture extracted by the transport format converter to generate bit map image information, and for transmitting the generated bit map image information through the IEEE 1394 asynchronous channel; and
      a navigation data processor for decoding the navigation data extracted by the transport format converter to generate screen control information, and for transmitting the generated screen control information through the IEEE 1394 asynchronous channel, and for controlling the reading of DVD information according to a navigation control command transmitted through the IEEE 1394 asynchronous channel from the second device, and
   the second device further comprises:

a user interface manager for transmitting, if the user's command is a navigation related command, the navigation related command as user interface data through the IEEE 1394 asynchronous channel to the navigation data processor, and for generating control information for controlling the user interface display if the user's command is a presentation related command; and a video mixer for receiving the screen control information and the bit map image information transmitted through the IEEE asynchronous channel and for displaying the bit map image in the corresponding region of a screen by a graphic overlay according to the control information generated by the user interface manager.

2. The apparatus of claim 1, wherein the video mixer includes a browser having the graphic overlay function.

3. An apparatus for transmitting information between devices via a network, comprising:

a first device having a transport format converter for receiving user interface data input via a user interface, wherein the user interface is used for commanding and controlling the first device, and for converting information into a transport format for transmission;

a second device having a display, wherein the display displays the user interface, wherein the interface is used for commanding and controlling the first device; and a physical layer for linking the first and second devices, wherein the transport format converter comprises:

an extractor for extracting video data and audio data in pack units from information in a program stream format read from a digital versatile disc (DVD);

a first transport stream packet generator for generating an additional information transport stream packet by adding a header to additional information required for program analysis in the second device, based on header information and packet generator timing information;

a second transport stream packet generator for generating a data transport packet stream by adding a header to both of the extracted video and audio data in pack units;

a multiplexer for multiplexing the outputs of the first and second transport stream packet generators to provide a transport stream; and said timing controller for controlling the timing in the generation of the additional information transport stream packet and the data transport stream packet, wherein the physical layer is an Institute of Electrical & Electronics Engineers (IEEE) 1394 interface, and wherein the extractor extracts navigation and sub-picture in pack units from the information and the first device further comprises:

a sub-picture processor for decoding the sub-picture extracted by the transport format converter to generate bit map image information;

a navigation data processor for decoding the navigation data extracted by the transport format converter to generate screen control information, and for controlling the reading of DVD information according to a navigation control command transmitted through the IEEE 1394 asynchronous channel from the second device; and a selection controller for selectively transmitting the bit map image information, the screen control information and the output of the transport format converter through the IEEE 1394 isochronous channel, and the second device further comprises:

a user interface manager for transmitting, if the user's command is a navigation related command, the navigation related command as user interface data through the IEEE 1394 asynchronous channel to the navigation data processor, and for generating control information for controlling the user interface display if the user's command is a presentation related command; and a video mixer for receiving the screen control information and the bit map image information transmitted through the IEEE isochronous channel and for displaying the bit map image in the corresponding region of a screen by a graphic overlay according to the control information generated by the user interface manager.

4. The apparatus of claim 3, wherein the video mixer includes a browser having the graphic overlay function.

5. An apparatus for transmitting information between devices via a network, comprising:

a first device having a transport format converter for receiving user interface data input via a user interface, wherein the user interface is used for commanding and controlling the first device, and for converting information into a transport format for transmission;

a second device having a display, wherein the display displays the user interface, wherein the interface is used for commanding and controlling the first device; and a physical layer for linking the first and second devices, wherein the transport format converter comprises:

an extractor for extracting video data and audio data in pack units from information in a program stream format read from a digital versatile disc (DVD);

a first transport stream packet generator for generating an additional information transport stream packet by adding a header to additional information required for program analysis in the second device, based on header information and packet generator timing information;

a second transport stream packet generator for generating a data transport packet stream by adding a header to both of the extracted video and audio data in pack units;

a multiplexer for multiplexing the outputs of the first and second transport stream packet generators to provide a transport stream; and said timing controller for controlling the timing in the generation of the additional information transport stream packet and the data transport stream packet, wherein the physical layer is an Institute of Electrical & Electronics Engineers (IEEE) 1394 interface, and wherein the extractor extracts navigation and sub-picture in pack units from the information and the first device further comprises a first navigation decoder for decoding the navigation data relating to data access, extracted by the transport format converter, and for controlling the reading of the DVD information according to a navigation control command transmitted through the IEEE 1394 asynchronous channel from the second device;

the second packet transport stream generator of the transport format converter packetizes the presentation related navigation data and the sub-picture;

the multiplexer multiplexes a navigation packet transport stream and a sub-picture packet transport stream together with an additional information packet transport stream and a data packet transport stream to output the multiplexed result into a transport stream format; and the second device further comprises:
a sub-picture decoder for decoding a sub-picture stream transmitted through the IEEE 1394 isochronous channel to generate bit map image information;
a second navigation decoder for decoding a navigation stream transmitted through the IEEE 1394 isochronous channel to generate screen control information;
a user interface manager for transmitting, if a user's command is a navigation related command, the command as user interface data through the IEEE 1394 asynchronous channel to the first navigation decoder, and for generating control information for controlling user interface display if the user's command is a presentation related command; and
a video mixer for receiving the bit map image information and the screen control information from the sub-picture decoder and the second navigation decoder and for displaying the bit map image in the corresponding region of a screen according to the control information generated by the user manager.

6. The apparatus of claim 5, wherein the video mixer includes a browser having a graphic overlay function.

7. An apparatus for transmitting information between devices via a network, comprising:
a first device having a transport format converter for receiving user interface data input via a user interface, wherein the user interface is used for commanding and controlling the first device, and for converting information into a transport format for transmission;
a second device having a display, wherein the display displays the user interface, wherein the interface is used for commanding and controlling the first device; and
a physical layer for linking the first and second devices, wherein the transport format converter comprises:
an extractor for extracting video data and audio data in pack units from information in a program stream format read from a digital versatile disc (DVD);
a first transport stream packet generator for generating an additional information transport stream packet by adding a header to additional information required for program analysis in the second device, based on header information and packet generator timing information;
a second transport stream packet generator for generating a data transport packet stream by adding a header to both of the extracted video and audio data in pack units;
a multiplexer for multiplexing the outputs of the first and second transport stream packet generators to provide a transport stream; and
said timing controller for controlling the timing in the generation of the additional information transport stream packet and the data transport stream packet,
wherein the physical layer is an Institute of Electrical & Electronics Engineers (IEEE) 1394 interface, and
wherein the extractor of the transport format converter extracts navigation data and sub-picture data in pack units from the information;
the second packet transport stream generator of the transport format converter packetizes the presentation related navigation data and the sub-picture;
the multiplexer of the transport format converter multiplexes a navigation packet transport stream and a sub-picture packet transport stream together with the additional information packet transport stream and a data .packet transport:stream to output the multiplexed result into a transport stream format; and the second device further comprises:
a sub-picture decoder for decoding a sub-picture stream transmitted through the IEEE 1394 isochronous channel to generate bit map image information;
a navigation decoder for decoding a navigation stream transmitted through the IEEE 1394 isochronous channel to generate screen control information;
a user interface manager for transmitting, if a user's command is a navigation related command, the command as user interface data through; an IEEE 1394 asynchronous channel to the first device, and for generating control information for controlling a user interface display if the user's command is a presentation related command; and
a video mixer for receiving the bit map image information and the screen control information from the sub-picture decoder and the navigation decoder and for displaying the bit map image in the corresponding region of a screen according to the control information generated by the user interface manager, wherein
the navigation decoder of the second device decodes navigation data relating to data access in addition to navigation data relating to data presentation, and the transport format converter packetizes all the data of the program stream into the transport stream, the program stream including the video data, the audio data, navigation data,; and sub-picture data.

8. An apparatus for transmitting information between devices via a network, comprising:
a first device having a transport format converter for receiving user interface data input via a user interface, wherein the user interface is used for commanding and controlling the first device, and for converting information into a transport format for transmission;
a second device having a display, wherein the display displays the user interface, wherein the interface is used for commanding and controlling the first device; and
a physical layer for linking the first and second devices, wherein the transport format converter comprises:
an extractor for extracting video data and audio data in pack units from information in a program stream format read from a digital versatile disc (DVD);
a first transport stream packet generator for generating an additional information transport stream packet by adding a header to additional information required for program analysis in the second device, based on header information and packet generator timing information;
a second transport stream packet generator for generating a data transport packet stream by adding a header to both of the extracted video and audio data in pack units;
a multiplexer for multiplexing the outputs of the first and second transport stream packet generators to provide a transport stream; and
said timing controller for controlling the timing in the generation of the additional information transport stream packet and the data transport stream packet,
wherein the physical layer is an Institute of Electrical & Electronics Engineers (IEEE) 1394 interface, and wherein the extractor extracts navigation data and sub-picture data in pack units from the information and the first device further comprises a navigation decoder for decoding the navigation data relating to data access, extracted by the transport format converter, and for controlling the reading of the DVD information according to a navigation control command transmitted through the IEEE 1394 asynchronous channel from the second device;

the second packet transport stream generator of the transport format converter packetizes the presentation related navigation data and the sub-picture;

the multiplexer of the transport format converter multiplexes a navigation packet transport stream and a sub-picture packet transport stream together with the additional information packet transport stream and a data packet transport stream to output the multiplexed result into a transport stream format; and the second device further comprises:

a sub-picture decoder for decoding a sub-picture stream transmitted through the IEEE 1394 isochronous channel to generate bit map image information;

a user interface manager for transmitting, if a user's command is a navigation related command, the command as user interface data through an IEEE 1394 asynchronous channel to the navigation decoder, and for generating control information for controlling a user interface display if the user's command is a presentation related command; and a video mixer for receiving the bit map image information and the screen control information from the sub-picture decoder and the navigation decoder of the first device and for displaying the bit map image in the corresponding region of a screen according to the control information generated by the user interface manager, wherein the navigation decoder of the first device decodes navigation data relating to data access in addition to navigation data relating to data presentation, and the transport format converter packetizes the video data, audio data and sub-picture data in a program stream, into a transport stream.

9. An apparatus for transmitting information via a network including an isochronous channel and an asynchronous channel, comprising:

an extractor for extracting a program stream read from a recording medium;

a transport format converter for converting the program stream into a transport stream; and an output unit for transmitting the transport stream via the network;

wherein sub-picture information and navigation information from the transport stream are transmitted through the asynchronous channel.

10. The apparatus of claim 9, wherein the apparatus further comprises a user interface manager for receiving a user's command.

11. The apparatus of claim 10, wherein the recording medium is a digital versatile disc (DVD).

12. The apparatus of claim 10, wherein the transport format converter comprises:

a first transport stream packet generator for generating an additional information transport stream packet by adding a header to additional information;

a second transport stream packet generator for generating a data transport packet stream by adding a header to extracted video and audio data in pack units;

a multiplexer for multiplexing outputs of the first and second transport stream packet generators to provide the transport stream; and a timing controller for controlling a timing in the generation of the additional information and the data transport stream packets, wherein the extractor extracts video, audio, navigation, and sub-picture in pack units from the information in a program stream format read from the recording medium.

13. The apparatus of claim 9, wherein the recording medium is a digital versatile disc (DVD).

14. The apparatus of claim 9, wherein the transport format converter comprises:

a first transport stream packet generator for generating an additional information transport stream packet by adding a header to additional information;

a second transport stream packet generator for generating a data transport packet stream by adding a header to extracted video and audio data in pack units;

a multiplexer for multiplexing outputs of the first and second transport stream packet generators to provide the transport stream; and a timing controller for controlling a timing in the generation of the additional information and the data transport stream packets, wherein the extractor extracts video, audio, navigation, and sub-picture in pack units from the information in a program stream format read from the recording medium.

15. The apparatus of claim 14, further comprising a physical layer, wherein the physical layer includes an Institute of Electrical & Electronics Engineers (IEEE) 1394 interface.

16. The apparatus of claim 9, wherein the apparatus further comprises:

a sub-picture processor for decoding the sub-picture extracted by the transport format converter, to generate bit map image information, and for transmitting the generated bit map image information through the asynchronous channel; and a navigation data processor for decoding the navigation data extracted from the transport format converter to generate screen control information.

17. The apparatus of claim 16, wherein the navigation data processor controls a reading of information according to a navigation control command received through the asynchronous channel.

18. The apparatus of claim 17, wherein the apparatus further comprises a selection controller for selectively transmitting the bit map image information, the screen control information and the output of the transport format converter through the isochronous channel.

19. An apparatus for receiving information via a network including an isochronous channel and an asynchronous channel, comprising:

a receiver for receiving program stream via the network;

a transport format converter for converting the program stream into a transport stream; and a user interface manager for receiving a user's command, wherein sub-picture information and navigation information from the program stream are received through the asynchronous channel.

20. The apparatus of claim 19, wherein the user interface manager receives the navigation information received through the asynchronous channel.

21. The apparatus of claim 20, wherein the user interface manager transmits the received information through the asynchronous channel to a navigation data processor linked with the apparatus via a physical layer when the received information is a navigation related command.

22. The apparatus of claim 21, wherein the user interface manager generates control information for controlling a user interface display when the user's command is a presentation related command.

23. The apparatus of claim 12, further comprising a physical layer, wherein the physical layer includes an Institute of Electrical & Electronics Engineers (IEEE) 1394 interface.

24. The apparatus of claim 20, wherein the user interface manager generates control information for controlling a user interface display when the user's command is a presentation related command.

25. The apparatus of claim 19, further comprising a sub-picture processor for decoding the sub-picture information extracted by the transport format converter to generate bit map image information, and a navigation data processor for decoding the navigation data extracted by the transport format converter to generate screen control information.

26. The apparatus of claim 25, further comprising a video mixer for receiving the bit map image information from the sub-picture processor and for receiving the screen control information from the navigation data processor.

27. An apparatus for receiving information via a network including an isochronous channel and an asynchronous channel, comprising:

a receiver for receiving a transport stream via the network;

a user interface manager for receiving a user's command, wherein sub-picture information and navigation information are received through the asynchronous channel.

28. The apparatus of claim 27, wherein the user interface manager receives the navigation information received through the asynchronous channel.

29. The apparatus of claim 28, wherein the user interface manager generates control information for controlling a user interface display when the user's command is a presentation related command.

30. The apparatus of claim 27, wherein the user interface manager transmits a navigation related command through the asynchronous channel when the user's command is a navigation related command.

31. The apparatus of claim 27, further comprising a video mixer for receiving sub-picture information through the asynchronous channel.

* * * * *